United States Patent [19]

Feinleib

[11] 4,366,222
[45] Dec. 28, 1982

[54] CADMIUM SULFIDE/CADMIUM CARBONATE/CADMIUM OXIDE PHOTOCONDUCTOR PRODUCED BY HIGH TEMPERATURE, INERT ATMOSPHERE CALCINATION

[75] Inventor: Morris Feinleib, Los Altos, Calif.

[73] Assignee: Varian Associates, Palo Alto, Calif.

[21] Appl. No.: 313,791

[22] Filed: Oct. 22, 1981

Related U.S. Application Data

[60] Continuation of Ser. No. 14,383, Feb. 21, 1979, abandoned, which is a division of Ser. No. 814,512, Jul. 11, 1977, abandoned.

[51] Int. Cl.$^3$ ............................................. G03G 5/087
[52] U.S. Cl. .................................... 430/127; 430/130; 430/134; 430/136
[58] Field of Search ................ 430/127, 130, 134, 136

[56] References Cited

U.S. PATENT DOCUMENTS 3,975,306  8/1976  Jones ...................................... 430/94

FOREIGN PATENT DOCUMENTS 1239129  7/1971  United Kingdom .

Primary Examiner—John D. Welsh

[57] ABSTRACT

Disclosed is a photoconductor of the cadmium sulfide/cadmium carbonate type which contains cadmium oxide in the range of 0.05 to 1.5 mole per cent. The calcination of this photoconductor is performed at the relatively high temperature range of approximately 250 degrees C. to 310 degrees C. in an inert atmosphere or in air, with between 265 degrees C. to 290 degrees C. being preferred. The resultant photoconductor, which can be used in both toner transfer and charge transfer electrophotography, has a higher photographic speed, faster discharge of residual charge, and less degradation of electrophotographic properties, particularly charge acceptance, at high humidities.

9 Claims, 3 Drawing Figures

CADMIUM SULFIDE/CADMIUM CARBONATE/CADMIUM OXIDE PHOTOCONDUCTOR PRODUCED BY HIGH TEMPERATURE, INERT ATMOSPHERE CALCINATION

This application is a continuation of application Ser. No. 014,383, filed Feb. 21, 1979, which was a division of application Ser. No. 814,512, filed July 11, 1977, both abandoned.

BACKGROUND OF THE INVENTION

1. Field of the Invention

This invention relates to an improved photoconductor of the cadmium sulfide/cadmium carbonate type and a method for making same. The photoconductor is typically set in an organic binder and is useful in both toner transfer and charge transfer electrophotography.

2. Description of the Prior Art

Numerous patents and other publications have disclosed methods for making photoconductors of the cadmium sulfide/cadmium carbonate type dispersed in an organic binder, such as U.S. Pat. Nos. 3,494,789; 3,506,595; 3,541,028; 3,589,928; 3,615,401; 3,704,123 and 3,867,139.

U.S. patent application Ser. No. 501,566, filed Aug. 29, 1974, commonly assigned with the present invention, teaches the importance of keeping ionic contaminants out of the end product and discloses methods for removing these ionic contaminants and assuring that they stay removed. That application discloses that:

(1) in lieu of cadmium sulfide, one may use cadmium selenide or a mixture of cadmium sulfide and cadmium selenide;

(2) a useful range for the amount of cadmium carbonate is between zero and four moles cadmium carbonate per mole of cadmium sulfide, cadmium selenide, or mixture thereof;

(3) the ionic contaminants from which the resultant end product is free are the group consisting of sodium, chlorine, bromine, potassium, and nitrate; and (4) the photoconductor is activated with a dopant selected from the group consisting of copper chloride, silver chloride, copper sulfate, silver sulfate, copper nitrate, silver nitrate, copper ammonia complex, silver ammonia complex, copper carbonate dissolved in ammonia, and silver carbonate dissolved in ammonia.

U.S. patent application Ser. No. 715,804 filed Aug. 19, 1976, and commonly assigned with the present invention, teaches that the calcination in an inert atmosphere such as nitrogen gas rather than air is a good safeguard for preventing the introduction of unwanted ionic contamination, particularly that of the sulfate ion.

Electrophotographic plates fabricated by the teachings of the prior art suffer, however, from certain limitations. Among these are the following:

1. The photographic speeds are not sufficiently high for some applications, e.g., in copiers in which a high throughput rate is desired and/or the amount of light available for exposure is limited.

2. Along with low speeds, one frequently encounters a "memory effect". For example, some copying machines using a cylinder coated with a photoconductive layer made according to the prior art may involve more than one complete cylinder revolution for producing each copy, and an undesired "ghost" image may be superimposed on the desired image. With faster photoconductors, residual charge is discharged more completely using an erasing light, and ghost images do not appear as readily.

3. At high humidities, a slight but definite degradation of the electrophotographic properties, particularly the charge acceptance, is observed. It is possible that, under the photoconductive power calcination conditions and procedures taught by the prior art, a small residue of ionic substances, even though not readily detected by analysis, may be present.

These and other drawbacks of the prior art are remedied by the present invention, some of the objects of which are as follows:

OBJECTS OF THE INVENTION

It is a primary object of the present invention to fabricate a photoconductor of the cadmium sulfide/cadmium carbonate type with a high photographic speed, coupled with a sufficient charge acceptance for most copying applications.

It is another object of the present invention to reduce or eliminate the memory effect associated with slower photoconductors.

It is another object of the present invention to disclose the fabrication of a photoconductor with a more dependable performance in a high humidity environment.

It is an additional object of the present invention to teach the fabrication of a photoconductor which is particularly suitable for sequential charge transfer electrophotography.

It is another object of the present invention to form a photoconductor which has a high stability of speed with respect to time.

It is another object of the present invention to produce a photoconductor with a spectral response tailored for different applications.

SUMMARY OF THE INVENTION

Briefly and in accordance with the above objects, the present invention is concerned with an electrophotographic layer wherein the pigment is of the cadmium sulfide/cadmium carbonate type, and a method for making such an electrophotographic layer. Instead of cadmium sulfide, one could use cadmium selenide or a mixture of cadmium sulfide and cadmium selenide. The final calcination of the electrophotographic powder is performed at a high temperature, such as 275 degrees C. for 6 hours, preferably in an inert atmosphere, in order to improve performance at high humidity and to manifest a high photographic speed.

The powder is characterized by the presence of a small but measurable amount of cadmium oxide, such as 0.05–1.5 mole % and preferably 0.2–1 mole % CdO. It should in fact be called a cadmium sulfide/cadmium carbonate/cadmium oxide photoconductor. Control of the amount of CdO for optimum performance is critical.

Photoconductors made from such powders exhibit a nearly panchromatic spectral response. This response is further optimized for any particular application by the control of doping.

Binder layers made from such powders have a memory effect that is readily manageable by equipment designers.

BRIEF DESCRIPTION OF THE DRAWINGS

These and other more detailed and specific objects and features of the instant invention are more fully disclosed in the following specification, reference being had to the accompanying drawings in which.

DETAILED DESCRIPTION OF THE PREFERRED EMBODIMENT

Figure 1:
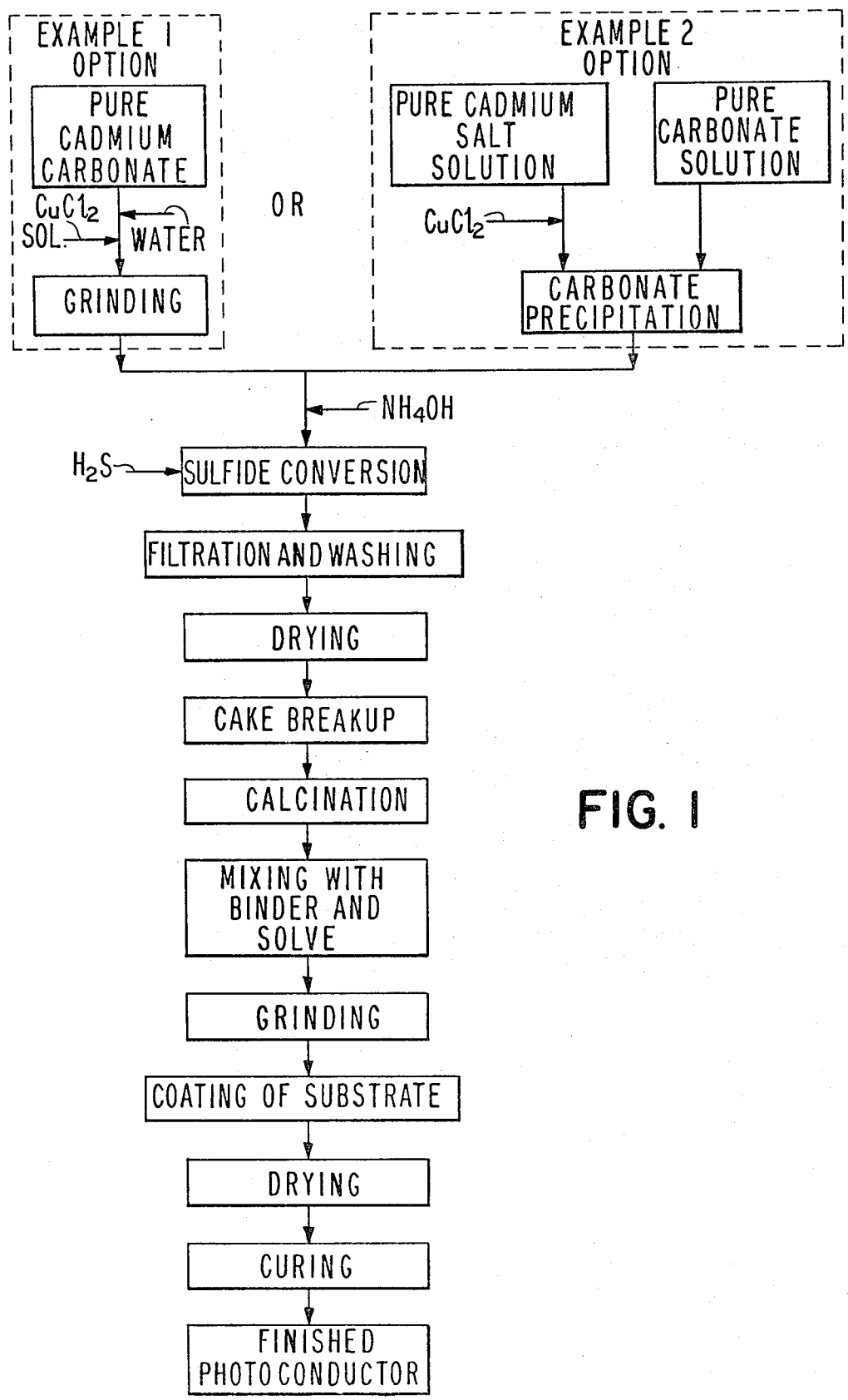
FIG. 1 is a flow chart diagram showing the method for preparing the photoconductor of the present invention.

Details of photoconductor preparation will be shown in the following examples, reference being had to the accompanying drawings, particularly FIG. 1.

EXAMPLE 1

The following materials are placed inside a ceramic grinding jar (Norton size 00, 1.13 liter capacity) containing 900 grams of grinding cylinders (Norton Burundum, $\frac{1}{2}'' \times \frac{1}{2}''$):

Cadmium Carbonate reagent (Allied Chemical Code 1483, lot E069): 140 grams
$CuCl_2 + 2H_2O$ (reagent), 1% solution (dopant): 56 ml
Deionized water: 540 ml

Grinding

Figure 2:
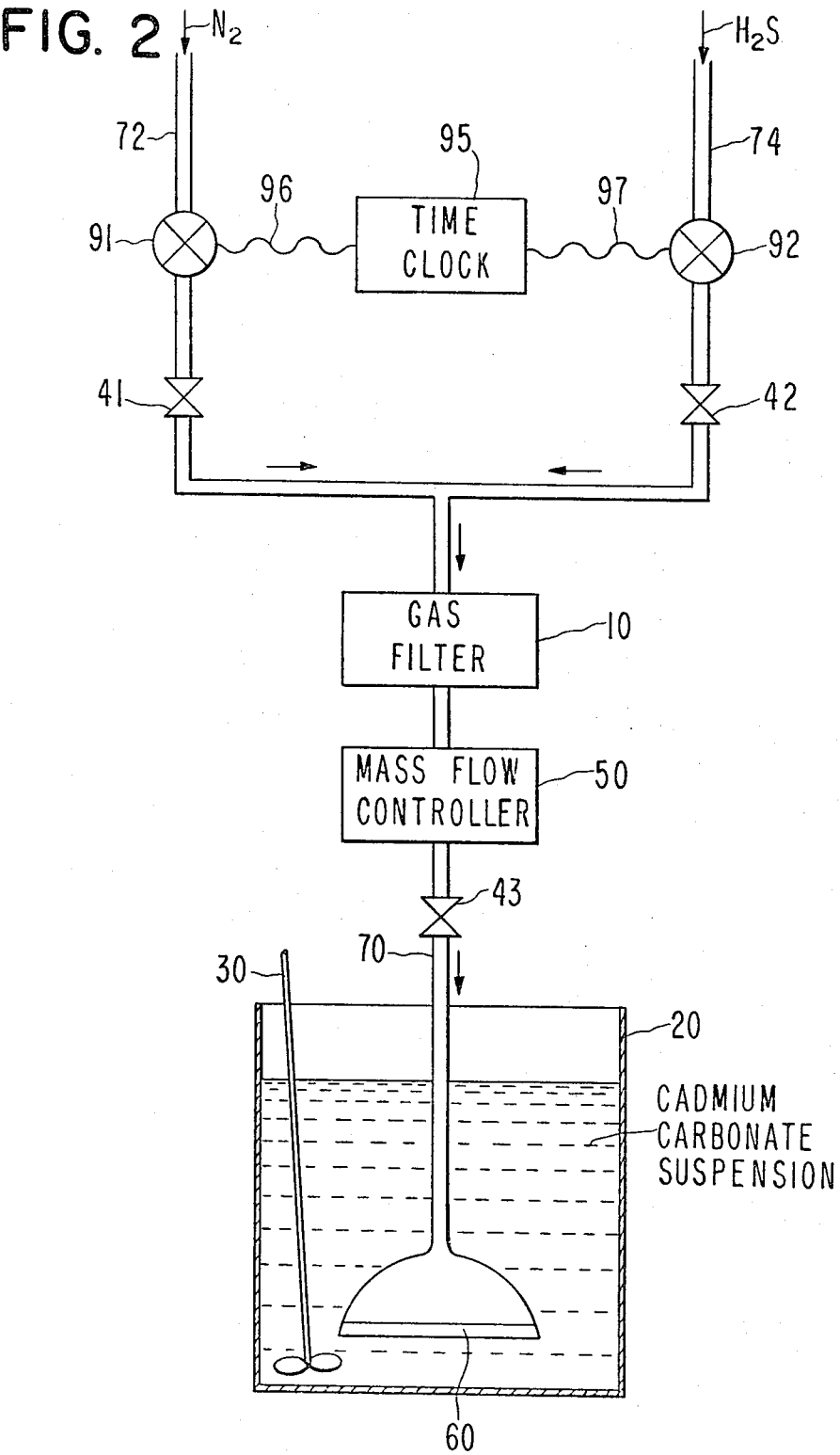
FIG. 2 is a schematic diagram showing the hydrogen sulfide conversion step of the method of fabricating the photoconductor layer of the present invention.

The jar is placed on rollers for 23 hours, and the mixture is ground at a speed of 76 R.P.M. It is then transferred to a 1250 ml beaker 20 provided with a mechanical or magnetic stirrer 30 (see FIG. 2). 70 ml of concentrated reagent ammonium hydroxide (28–30% $NH_3$) are added, and stirring is continued for 5–10 minutes before the start of the sulfide conversion step.

Sulfide Conversion

During sulfide conversion, a controlled amount of hydrogen sulfide reacts with $CdCO_3$ to yield a CdS-X $CdCO_3$ material. Alternatively, hydrogen selenide or a mixture of hydrogen sulfide and hydrogen selenide is employed to react with the cadmium carbonate. This step is more particularly illustrated in FIG. 2. A Tylan mass flow controller 50 is set for 48 standard cc/min. Check valves 41, 42, and 43 are one-way valves inserted into inlet lines 72 and 74 and gas line 70, respectively, to insure that gas can flow through the system in a forward direction only. Gas filter 10 is inserted between check valves 41 and 42 and mass flow controller 50 to protect the latter. Solenoid valves 91 and 92, which are inserted in inlet lines 72 and 74, respectively, upstream of check valves 41 and 42, respectively, are on/off valves which control the flow of gas flowing through inlet lines 72 and 74, respectively, and which are turned on and off by signals emanating from time clock 95, which may be preset so as to control the amount of time that $N_2$ will flow through inlet line 72 and $H_2S$ will flow through inlet line 74. Time clock 95 communicates with solenoid valves 91 and 92 via electrical lines 96 and 97, respectively. A fritted glass dispersion bubbler 60 (porosity C) is connected to the gas line 70, and inserted into the carbonate slurry just above stirrer 30. The system is first purged with nitrogen gas which enters the system through inlet line 72. The flow is then switched to $H_2S$ entering through inlet line 74 for 3 hours, and the color of the suspension gradually changes from white to yelloworange. Some thickening of the slurry also occurs, and it may be desirable to add more deionized water either before or during the conversion. After 3 hours, solenoid valve 92 is closed and valve 91 opened, thereby switching the gas back to nitrogen to purge the residual $H_2S$. The bubbler 60 is then removed from beaker 20; a deionized water wash bottle is used to remove most of the deposit adhering to the fritted glass; and the product is ready for filtration.

Filtration and Washing

A centrifugal filter (Damon/IEC Division, Model CH chemical centrifuge) provided with a perforated stainless steel basket is used to remove the liquid and wash the product. The basket is lined with a strip of filter paper (e.g. Carl Schlecher and Schuell Co. No. 576) and placed in the centrifuge; the paper is wetted down to insure proper seating, and spun with deionized water before filtration. The slurry is then added relatively slowly so as to prevent overflow over the top lip of the basket. The filtrate is at first collected, as some overflow or imperfect filtration may occur on the first pass; if so, the liquid is recycled until it comes through fairly clear. At that point, the filter cake is washed with deionized water while spinning for about 60 minutes. The water is then turned off and the cake is spun-dry until a network of cracks is observed—this will take another 15 minutes approximately. Centrifuging speeds are approximately 2700 R.P.M. during filtration, 3700 R.P.M. during washing and 4200 R.P.M. during spin-drying.

Drying

The basket containing the cake and filter paper is put into a drying oven at 110–120 degress C. for about 15 hours to dry the material and remove some of the volatile salts. Alternatively, the cake may be removed after 2 hours and transferred to a dish for further drying.

Cake Breakup

The dry filter cake consists of chunks which must be pulverized before calcination. The filter paper is peeled, and the chunks put either through a mortar and pestle followed by screening through a 25 mesh sieve, or preferably through a laboratory mill with crusher feed (e.g., Quaker City Mill, A. W. Straub Mfrs.). This operation should be carried out under a hood, and furthermore it is desirable to enshroud the mill with a bag to limit dusting. The crushed powder is transferred to an aluminum tray 110 (30 cm × 6.4 cm × 3 cm high) and leveled. It is now ready to be calcined under a stream of dry nitrogen.

Calcination

Figure 3:
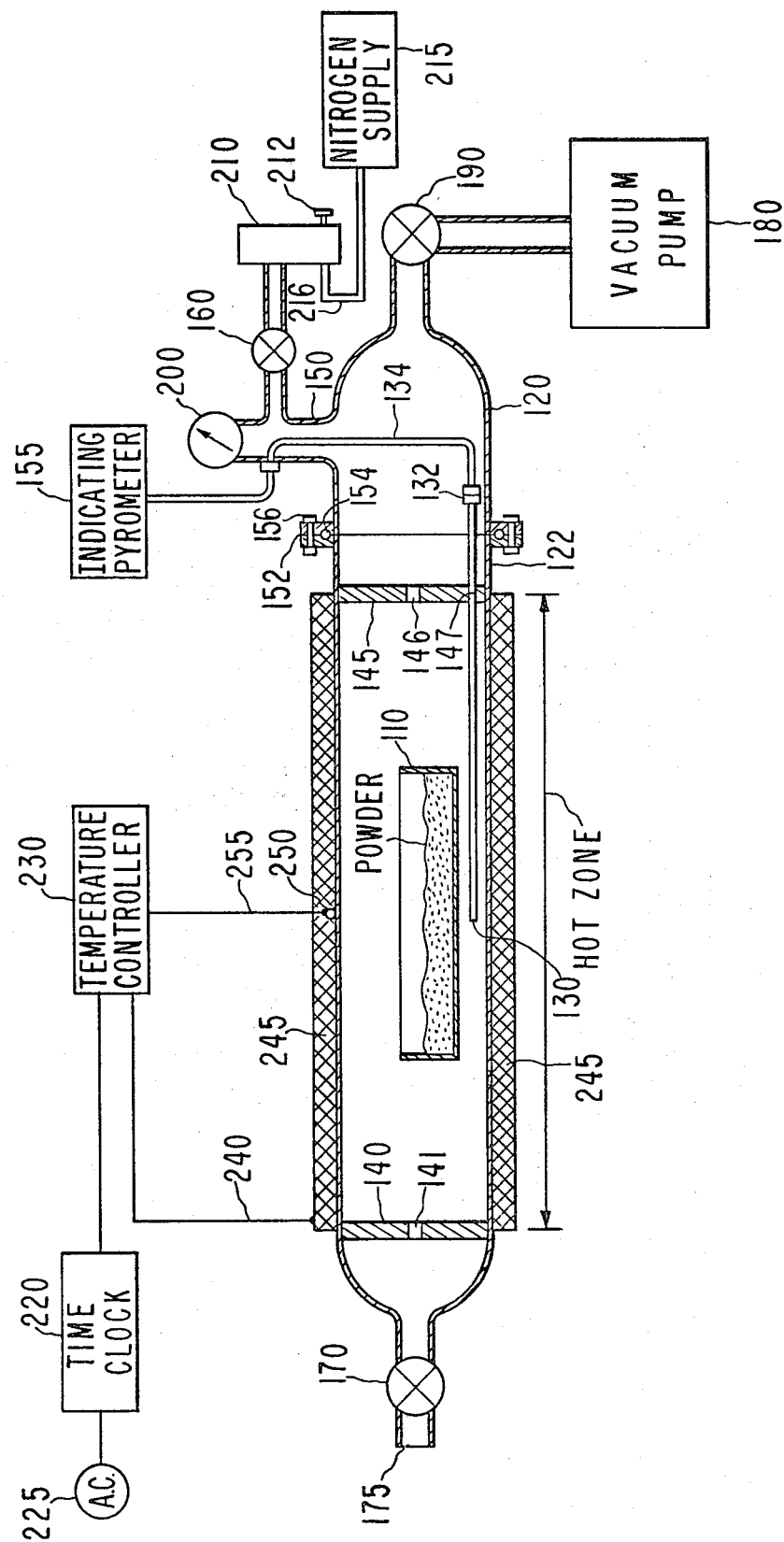
FIG. 3 is a schematic diagram of the furnace employed in the calcination step of fabricating photoconductive layers of the present invention.

Temperature uniformity and control in the calcination step are very important, and the calcining furnace (FIG. 3) has been designed to insure a long zone of uniform temperature. Calcination can be performed at temperatures in the range of 250 degrees C.–310 degrees C. with 275 degrees C. being preferred for the case where the firing is done in nitrogen and 290 degrees C. being preferred when the firing is done in air. The furnace tube 120 is divided into two portions, a furnace body 122 and a furnace head 150. The two portions of the furnace are joined by means of flange 152. The two halves of flange 152 surround O-ring 154, which provides a vacuum seal, and are gripped by one or more clamps 156 which firmly hold body 122 and head 150 together. Two circular heat shields, 140 and 145, fit within the cylindrical interior cavity of furnace body 122 and serve to keep as much heat as possible within a "hot zone" of furnace body 122. Each heat shield is bored through with a small aperture, 141 and 146 respectively, which serve to allow gas to flow from the "hot zone" to remaining portions of furnace body 122, and vice versa. A nitrogen gas supply 215 is positioned to feed nitrogen gas through nitrogen supply line 216 to furnace head 150. Positioned along nitrogen supply line 216 is nitrogen flow meter 210, provided with regulation valve 212, which controls the rate of nitrogen flowing through supply line 216 continuously.

Heat shield 140 is at least a quasi-permanent fixture of furnace body 122. The tray 110 containing the crushed powder is inserted into the furnace tube 120, followed by a reading thermocouple 130 and heat shield 145. The thermocouple is connected at connector 132 to an extension 134 feeding through the furnace head 150 and thence to indicating pyrometer 155, which measures the temperature in the "hot zone" of the furnace, i.e., that zone lying between heat shields 140 and 145. An additional hole 147 may be drilled in heat shield 145 to allow the external connection to thermocouple 130. Furnace head 150 is then clamped to furnace body 122. In order to remove air from the powder efficiently, the following sequence of events is performed:

(1) The nitrogen feed valve 160 and the tube exit valve 170 are closed. These valves are on/off valves inserted into nitrogen feed line 216 and exit line 175, respectively, for controlling the flow of gas into and out of furnace tube 120.

(2) The vacuum pump 180 is started and the vacuum valve 190 in the furnace head is opened. This valve is an on/off valve which when open, allows pump 180 to remove air from tube 120.

(3) Pumping continues until the vacuum gauge 200 reads about 30 inches of mercury. This should take about 5 minutes.

(4) The vacuum valve 190 is closed, the nitrogen regulation valve 212 is cracked open and the nitrogen feed valve 160 is opened. The flow rate should be moderated so as not to blow powder all over the furnace: it is advisable to keep it below one standard liter/minute.

(5) When the pressure is close to atmospheric, the nitrogen feed valve 160 is closed, thus stopping the flow of nitrogen from nitrogen supply 215 into tube 120.

(6) The vacuum valve 190 is again opened and the furnace pumped down a second time to again remove gas from furnace tube 120. (degassing is faster on the second round).

(7) Steps 3 and 4 repeated.

(8) When the pressure is back to atmospheric, the vacuum pump 180 is turned off and the vacuum valve 190 is briefly opened to let down the pump. The vacuum valve 190 is closed again.

(9) When the pressure slightly exceeds atmospheric, the exit valve 170 is opened and the nitrogen flow set to 500 cc/min by means of nitrogen regulation valve 212.

(10) The time clock 220 is set to turn the furnace power on for the desired length of time, e.g. 6 hours plus 45 minutes warmup. Time clock 220, energized by source of alternating electrical current 225, powers temperature controller 230. The temperature controller 230 is set to keep the furnace at 275 degrees Centigrade. Heating element 245, which enshrouds furnace tube 120, is connected to temperature controller 230 via electrical line 240. Control thermocouple 250 measures the temperature within the hot zone of the furnace and communicates this information to controller 230 via line 255.

(11) The calcined powder is cooled under nitrogen to 150 degrees C. or lower, after which it can be removed from the furnace and stored.

The calcined power has a $CdS:CdCO_3$ mole ratio close to 1.

During calcination, residual salts not previously removed by washing are volatilized. A portion of the chloride introduced as cupric chloride may also volatilize as ammonium chloride. However, no copper is lost in this step.

Mixing with Binder and Solvents

The photoconductor powder can be compounded with an electrically insulative binder and solvents for application to substrates by any of the methods known in the art, e.g. spraying, dipping, or blade coating. A typical mix for spraying is prepared as follows:

Calcined photoconductor powder: 140 grams
Acryloid AT-50 (a thermosetting acrylic resin, Rohm and Haas Co.): 130 grams
SC-100 (an aromatic hydrocarbon solvent with a boiling range of 161–177 degrees C., Central Solvents & Chemical Co.): 205 ml
n-butanol: 14 ml
2-ethxoyethyl acetate: 22 ml
1% solution of DC-200 (silicone oil, Dow-Corning Corp.) in xylene: 2.5 ml Grinding This preparation is ground in a ceramic jar (Norton size 00) containing 900 grams of $\frac{1}{2}"\times\frac{1}{2}"$ Burundum grinding cylinders (Norton Co.) for 23 hours, at a jar revolution speed of 76 R.P.M. The viscosity of the mix is then adjusted, by adding a solvent of 92 volumes SC-100/8 volumes n-butanol, to a value of 25 seconds using a Zahn No. G2 cup viscosimeter (General Electric Co.). The paint is strained through a 325 mesh sieve and is then ready for spraying. Because of the high specific gravity of the photoconductive pigment, it is advisable to provide the spray installation with a system for circulating the paint. Any mix not immediately used is put into a jar and rolled without grinding media.

Coating of Substrate

The mix is applied to a conductive substrate or "plate", usually to a finished thickness of 20–35 micrometers. The term "plate" as used herein may refer to a cylinder or flexible belt as well as a flat plate. Useful substrate materials include aluminum, aluminized plastic film, tin oxide-coated glass, etc.

Drying and Curing

The sprayed plate is first dried, with or without the assistance of mild heating, then cured for one hour in a circulating air oven set at 200 degrees C. It is then cooled and is ready for use in an electrophotographic machine.

EXAMPLE 2

Instead of procuring a cadmium carbonate, the material is prepared starting with pure compounds containing cadmium and carbonate. Remembering the importance of avoiding ionic contaminants in the photoconductor, the choice of such chemicals must be limited so that any undesired residues of reactions will be removed during one of the processing steps (e.g., washing, calcining). Thus the cadmium salt could be the nitrate or acetate; the carbonate compound could be ammonium carbonate or bicarbonate, or $CO_2$ itself. Carbonate precipitation is effected by mixing solutions or bubbling $CO_2$ through a cadmium salt solution, as is well known in the art. The copper chloride doping solution could be mixed with the cadmium solution before precipitation or could be added after precipitation but before hydrogen sulfide bubbling. From the addition of ammonia and the conversion on, the steps detailed in Example 1 are followed.

EXAMPLE 3

This is identical to Example 1, except that the calcination is carried out in a furnace open to air. This has the drawback of generating some undesired sulfate by air-oxidation of cadmium sulfide, which impairs the long-term stability of photoconductors made from such a material. Nevertheless, the higher calcination temperature will again yield a fast photoconductor, one that has definite utility in applications where long-term stability is not a serious problem. It has been found that, for comparable photoconductor speeds, the raw material calcined in air should be fired at a somewhat higher temperature than raw material calcined in nitrogen, e.g. 290 degrees C. compared to 275 degrees C.

The higher photoconductor sensitivities achieved as a result of the higher calcination temperatures were completely unexpected, for both the air calcination and nitrogen calcination examples. There is good reason to believe that the higher speed can be traced to the presence of a small amount of cadmium oxide in the photoconductor calcined at high temperatures. Above 250 degrees, C., the rate of decomposition of cadmium carbonate according to the reaction: $CdCO_3 \rightleftharpoons CdO + CO_2$ becomes appreciable and, of course, the higher the temperature, the greater the extent of decomposition. For that reason, close control of calcination conditions is essential for achieving reproducible photoconductor properties.

The useful range of cadmium oxide concentration in the photoconductor is 0.05 to 1.5 mole%, and the preferred range is 0.2 to 1.0 mole %. When the amount of CdO becomes too large, the charge acceptance of the photoconductor begins to suffer.

The amount of CdO present is below the detection limit of routine X-ray diffraction analysis. It can, however, be determined by firing a sample of photoconductor in a stream of carbon dioxide and measuring the weight gain. The following procedure is used: a clean boat (e.g. fused silica, alumina) is tared, filled with a sample of calcined photoconductor powder and kept for several hours in an oven at 75–100 degrees C. It is then cooled in a desiccator and weighed. Next, the boat is placed inside the calcining furnace (FIG. 3) described above, which in the present case is connected to a source of carbon dioxide rather than nitrogen. Before heating, one goes through the steps 1-9 described above under the calcination procedure. The firing under a stream of $CO_2$ is carried out at about 220 degrees C. for 3 to 4 hours, after which the sample is cooled under $CO_2$. The boat is then transferred back to the oven at 75–100 degrees C., cooled in the desiccator, and reweighed. The weight gain is translated into an equivalent amount of cadmium oxide according to the formula $CdO + CO_2 \rightarrow CdCO_3$.

Spectral Response and Doping

The photoconductive coating described herein is sensitive over most of the visible light spectrum: in its ability to copy various colors, it comes close to being panchromatic. The most difficult color to copy is yellow, and red colors are more difficult to copy than the blue-green parts of the spectrum; this is especially true in copiers provided with an incandescent exposing light source, which is rich in red light.

The spectral response of the photoconductor is somewhat influenced by the degree of doping. This is particularly true at the red end of the spectrum. As shown in the examples, cupric chloride is a representative doping agent. A useful doping range is from 0.05 to 2.0 mole % copper based on the total number of moles in the photoconductor powder, i.e., the total number of moles containing either cadmium or copper, with a preferred range of 0.1 to 1.5 mole %. At lower doping levels, the ability to copy red image areas is enhanced, but the photoconductor memory is somewhat higher, and the constancy of print density suffers somewhat. At higher doping levels, the converse is true. The doping level in the examples (approximately 0.4%) gives a general utility photoconductor. The selection of a doping concentration will be determined by the specific application of the photoconductor.

The above description is meant to illustrate the preferred embodiment and should not be taken to limit the scope of the invention. The scope of the invention is demarcated only by the following claims. From the above discussion, many variations will be apparent to one skilled in the art that would yet be encompassed by the true spirit and scope of the invention.

What is claimed is:

1. A method for making a cadmium chalcogenide-cadmium carbonate electrophotoconductive plate comprising the steps of:
   adding hydrogen sulfide gas, hydrogen selenide gas, or a gas comprising a mixture of hydrogen sulfide and hydrogen selenide to a cadmium carbonate suspension;
   drying and breaking up the resultant product into a fine powder;
   calcining the powder in an inert gas at between about 250 and about 310 degrees centigrade to produce a photoconductive powder comprising cadmium sulfide, between zero and four moles of cadmium carbonate for each mole of cadmium sulfide, and between 0.05 and 1.5 mole percent of cadmium oxide, said powder being substantially free of ionic contaminants;
   mixing the photoconductive powder with binder and solvents to form a paste; and
   coating the paste onto a relatively more conductive substrate to produce an electrophotoconductive plate.

2. The method of claim 1 wherein the calcining step is performed at a temperature of approximately 275 degrees C. in an inert gas.

3. The method of claim 2 wherein the inert gas is nitrogen.

4. The method of claim 3 wherein the calcining step is performed for approximately six hours.

5. The method of claim 1 wherein the cadmium carbonate suspension is prepared by mixing and grinding cadmium carbonate reagent, an activator dopant and deionized water.

6. The method of claim 5 wherein the dopant is selected from the group consisting of copper chloride, silver chloride, copper sulfide, silver sulfate, copper nitrate, silver nitrate, copper ammonia complex, silver amonia complex, copper carbonate dissolved in ammonia and silver carbonate dissolved in ammonia.

7. The method of claim 5 wherein the dopant is copper chloride.

8. The method of claim 1 wherein the cadmium carbonate is prepared by reacting a cadmium salt with a carbonate compound.

9. A method of making a cadmium chalcogenide-cadmium carbonate photoconductive material comprising the steps of:
bubbling hydrogen sulfide gas through a cadmium carbonate suspension containing copper chloride and wherein the resultant product contains between about 0.1 and 1.5 mole percent copper as an activator dopant;

filtering, washing, drying, and breaking up the resultant product into a fine powder;

calcining the powder at about 275 degrees centrigrade for about 6 hours in nitrogen gas to produce a photoconductor powder comprising cadmium sulfide, between zero and four moles of cadmium carbonate for each mole of cadmium sulfide, and between 0.2 and 1.0 mole percent cadmium oxide;

mixing the photoconductor powder with an electrically insulative binder and solvents to produce a paste;

coating the paste onto an electrically conductive substrate;

drying and curing the coated substrate to produce a photoconductive material; and wherein said photoconductive material consists essentially of matter which is substantially free from ionic contamination, except that said material contains said quantity of copper chloride dopant.

* * * * *